United States Patent
Worst

[15] 3,662,197
[45] May 9, 1972

[54] COMBINATION MOTOR-CLUTCH APPARATUS

[72] Inventor: Joseph C. Worst, Louisville, Ky.
[73] Assignee: General Electric Company
[22] Filed: Nov. 12, 1970
[21] Appl. No.: 88,937

[52] U.S. Cl. .............................................. 310/78, 310/113
[51] Int. Cl. ........................................................ H02k 7/108
[58] Field of Search .......................... 310/76, 78; 192/.02, 90

[56] References Cited

UNITED STATES PATENTS

| 2,280,736 | 4/1942 | Winther | 192/90 X |
| 1,143,008 | 6/1915 | Willey | 192/90 X |
| 1,853,864 | 4/1932 | Kingston | 310/78 X |

*Primary Examiner*—David X. Sliney
*Attorney*—Walter E. Rule, Francis H. Boos, Jr., Frank L. Neuhauser, Oscar B. Waddell and Joseph B. Forman

[57] ABSTRACT

A combination motor-clutch assembly wherein the input and output members of the clutch are normally held in driving engagement by a biasing means, and having an electromagnetic coil which induces a magnetic field in the output member to overcome the operation of the biasing means and to move the output member axially to control the torque transmitted between the input member and the output member and to effect disengagement of these members.

1 Claim, 2 Drawing Figures

PATENTED MAY 9 1972 3,662,197

INVENTOR.
JOSEPH C. WORST
BY Walter C. Hule
HIS ATTORNEY 3,662,197

1

COMBINATION MOTOR-CLUTCH APPARATUS

BACKGROUND OF THE INVENTION

This invention relates to a combination motor-clutch apparatus and particularly to such an apparatus in which the clutch is of the electro-mechanical type.

The drive systems of appliances such as automatic washing machines commonly incorporate a clutch which enables the user to operate the appliance at a wide selection of operating speeds to suit various types of fabric loads. In order to save space and in order to reduce the manufacturing costs of such appliances, it is known to incorporate into a single assembly such a clutch and the driving motor of the appliance whereby a single compact unit is provided embodying a minimum number of parts. Reference is made to application Ser. No. 6,486 filed Jan. 28, 1970, in the names of John Bochan and Robert M. Fey, (now U.S. Pat. No. 3,582,697) and assigned to the assignee of the instant invention, which application discloses and claims such a combination motor-clutch apparatus adaptable for use in an automatic washing machine.

Despite the fact that most washing loads are performed with the machine running at full speed, most known combination motor-clutch assemblies provided for use in automatic washing machines have clutches which are normally disengaged and which require the supply of electric current to the clutch coil to transmit torque through the clutch. This arrangement has the disadvantage that during operation, the clutch coil must be supplied with maximum power, whereby the life of the clutch components may be substantially shortened. Moreover, if an open circuit should occur within the power supply circuit to the electromagnetic coil, no torque may be transmitted through the clutch to drive the appliance.

It is therefore one object of the present invention to provide an improved combination motor-clutch assembly.

It is another object of the present invention to provide such an improved motor-clutch assembly wherein the input and output members of the clutch are normally biased into driving engagement whereby no electric current need be supplied to the electromagnetic coil in order for the clutch to drive the appliance at full speed.

It is still a further object of the present invention to provide such an improved motor-clutch assembly in which the electromagnetic coil is operative to overcome the operation of the biasing means to control the torque transmitted between the input member and the output member and to effect disengagement of these members.

SUMMARY OF THE INVENTION

In accordance with one aspect of the present invention there is provided a combination motor-clutch assembly comprising an electric motor having a rotor, a stator, and a rotatable shaft mounting said rotor, and at least one end shield carrying a bearing means for the shaft. An electrical clutch is positioned around the shaft adjacent the end shield and has a clutch input member driven from the shaft, a clutch output member mounted around the shaft and rotatable with respect thereto, and an electromagnetic coil for inducing a magnetic field within the output member. A clutch cover supported from the end shield has a coil mounting means associated therewith to support the coil. The coil mounting means also serves as a flux path for the magnetic field produced by the coil to pass the flux to the output member. The output member is axially movable with respect to the input member to effect engagement and disengagement with the input member. A biasing means is associated with the output member and is adapted to normally maintain the output member in driving engagement with the input member. The electromagnetic coil is operative to overcome the operation of the biasing means and to move the output member axially to control the torque transmitted between the input member and the output member and to effect disengagement of these members.

2

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing, in which:

DESCRIPTION OF THE PREFERRED EMBODIMENT

Figure 1:
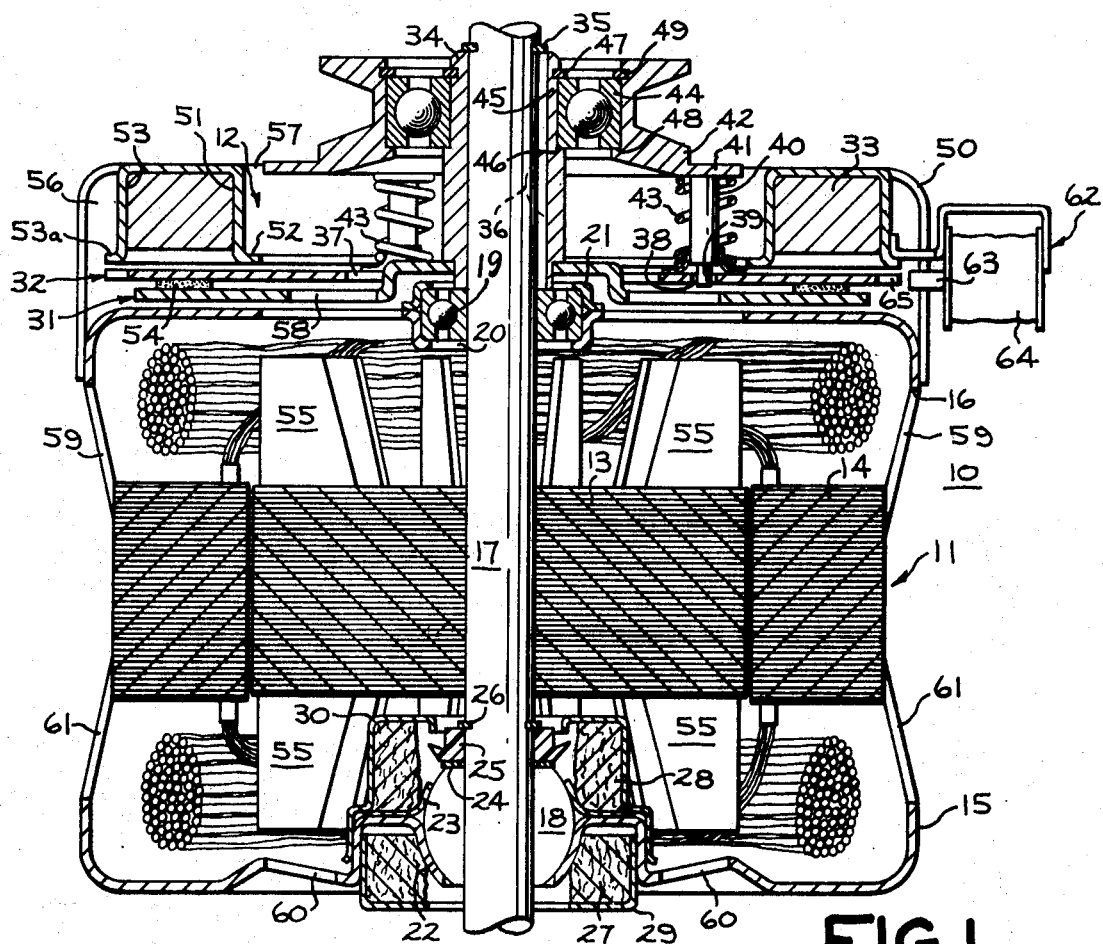
FIG. 1 is a cross-sectional elevational view of one embodiment of the combination motor-clutch apparatus of the invention.
Figure 2:
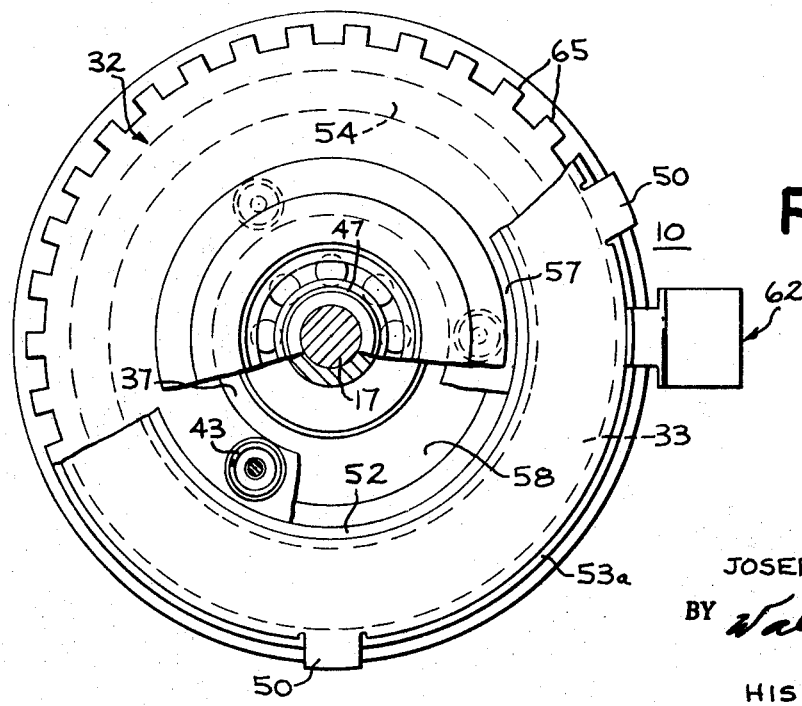
FIG. 2 is a plan view of the apparatus of FIG. 1, the view being partially broken away to show details.

Referring now to the drawing, and initially to FIG. 1 thereof, there is illustrated a new and improved integrated motor-clutch apparatus 10 including an electric motor generally indicated by the numeral 11 and an electro-mechanical clutch generally indicated by the numeral 12. The motor 11 includes a rotor 13 and a stator 14. The stator 14 comprises a laminated steel assembly to which are welded end shields 15 and 16 which mount bearings for rotor shaft 17. Specifically, a sleeve bearing 18 is supported by end shield 15 and a ball bearing 19 is carried by end shield 16. It will be seen that ball bearing 19 is pressed into an annular recess 20 formed in end shield 16 and is held in place by a cap member 21 spot welded to the end shield 16. Sleeve bearing 18 is similarly supported by a recess 22 formed in end shield 15 and is held in place by a flanged cap member 23 spot welded to the end shield 15. Positioned adjacent sleeve bearing 18 on shaft 17 is a thrust plate 24 and a molded thrust washer 25 which also acts as an oil slinger. A snap ring 26 holds thrust washer 25 in place on the shaft. Oil reservoirs 27 and 28, defined in part by members 29 and 30 pressed onto end shield 15, contain felt wicks which are adapted to hold a supply of lubricant and deliver it to sleeve bearing 18.

Electro-mechanical clutch 12 is positioned around motor shaft 17 adjacent end shield 16, and includes an input member 31 driven from shaft 17, and output member 32 mounted around shaft 17 and rotatable relative thereto, and an electromagnetic clutch coil 33. In accordance with the present invention, input member 31 and output member 32 are normally engaged so as to transmit torque therebetween, and magnetic clutch coil 33 is provided for inducing a magnetic field to disengage input member 31 and output member 32. In the preferred embodiment shown, output member 32 is axially movable relative to input member 31 for disengagement therefrom.

Clutch input member 31 comprises a disc-like structure which is rigidity connected to and supported by an elongate bushing 34. Bushing 34 is positioned on shaft 17 between bearing 19 and a snap ring 35, and is keyed to shaft 17 for rotation therewith by means of a Woodruff key 36. Clutch output member 32 comprises an annular disc having a relative large central opening 37 formed therein and having a plurality of apertures 38 formed therethrough. Extending into each of the apertures 38 is a cylindrical end formation 39 of a drive pin 40 which connects at its upper end with a flange 41 formed on a driven member 42. Operative between flange 41 and output member 32, and positioned concentrically about drive pins 40, are a plurality of compression coil springs 43 adapted to normally maintain output member 32 in engagement with input member 31. By this arrangement, output member 32 will be seen to be drivingly connected at all times to driven member 42.

Driven member 42 forms an output pulley which is rotatably mounted on shaft 17 for free rotation relative thereto. Pulley or driven member 42 is supported by a ball bearing 44 from bushing 34, the bearing 44 being mounted on a reduced diameter end section 45 of bushing 34 and being restrained from axial movement relative to bushing 34 on one side by a shoulder 46 and on the other side by a snap ring 47. Member 42 is likewise restrained from axial movement relative to bearing 44 on one side by a shoulder 48 and on the other side by a snap ring 49.

Secured to end shield 16 by spot welding is a clutch cover 50 which extends upwardly from its connection to end shield and subsequently turns radially inwardly to provide a means to shield and protect the clutch 12. Continuing radially inwardly, it will be seen that the clutch cover 50 turns downwardly providing a vertically oriented annular surface 51 spaced radially outwardly of the springs 43, and terminates in a radially inwardly extending flange 52.

In order to support coil 33 from clutch cover 50, a coil mounting means in the form of tabs 53 formed integrally with the clutch cover 50 may be provided to extend downwardly at a position spaced radially outwardly of surface 51, whereby an interrupted recess is formed between tabs 53 and surface 51 into which coil 33 may be press-fitted.

In addition to serving as a means of support for coil 33, the tabs 53 and the depending surface 51 additionally serve as a flux path for the magnetic field produced by the coil for the purpose of passing such magnetic flux to the axially movable clutch output member 32. As will be evident from FIG. 1, each of the tabs 53 depends slightly below the lower surface of clutch coil 33 and terminates in a substantially horizontally extending portion 53–a positioned adjacent the upper surface of disc-like output member 32. Similarly, inwardly turned flange 52 depends slightly below the lower surface of clutch coil 33 and extends adjacent the upper surface of disc-like output member 32. By this arrangement, magnetic flux path is completed from coil 33 through the tab portions 51–a, through output member 32 to the flange 52 and back to coil 33. With such a flux path, when current flow is induced through coil 33, output member 32 will be attracted theretoward causing output member 32 to disengage input member 31.

As annual friction ring 54 of suitable friction material such as cork is bonded to the clutch input member 31. As was previously mentioned, output member 32 is normally in engagement with input member 31 whereby the normal force between these members enables the annular friction ring 54 to provide a driving connection therebetween for the transmission of torque. However, when current flow is induced in coil 33, output member 32 is attracted theretoward, thereby decreasing the normal force between input member 31 and 32 and causing a corresponding decrease in the amount of torque transmitted therebetween. A supply of maximum power to coil 33 will result in complete disengagement of input member 31 and output member 32.

Rotor 13 may have a plurality of vanes 55 formed on the upper and lower portions thereof to augment the flow of cooling air therethrough. Such vanes 55 may cause cooling air to be drawn through openings 56 in clutch cover 50 and through the central aperture 57 in clutch cover 50, through central opening 37 in output member 32, through openings 58 in input member 31, and into the motor 11 for discharge through openings 59. In a similar fashion, air may be drawn through openings 60 in the lower motor end shield 15 and discharged through openings 61.

In order to regulate the torque transmitted by clutch 12 from rotor shaft 17 to output pulley 42, an appropriate control circuit including an output speed sensor 62 may be used to connect coil 33 to a source of electrical energy. Speed sensor 62 is representatively shown as a tachometer generator including a permanent magnet core 63 and a coil 64. The outer periphery of output member 32 may be provided with a plurality of circumferentially spaced teeth 65 thereon which rotate adjacent core 63. This produces a pulsating flux field whereby a voltage is induced in the coil 64. By this arrangement, an electrical signal is produced within coil 64 which is proportional to the output speed of the clutch 12. The signal so produced may then be fed to an appropriate control circuit to regulate the current flow through coil 33. Reference is made to U.S. Pat. No. 3,483,719 issued Dec. 16, 1969, to D. S. Heidtman and assigned to the assignee of the instant invention, for description of a control circuit adapted to control a clutch of the type described herein.

As was previously mentioned, the system of the present invention is adapted for use in automatic clothes washers and other such appliances wherein it is desirable to provide a combination motor-clutch assembly having clutch input and output members normally biased into driving engagement whereby no electric current need be supplied to the electromagnetic clutch coil in order for the clutch to drive the appliance at full speed. It should now be apparent that the present invention provides such a combination motor-clutch assembly which is simple and inexpensive in design and highly reliable in operation.

As will be evident from the foregoing description, certain aspects of the invention are not limited to the particular details of construction described and illustrated, and it is intended that the appended claims shall cover such modifications of the invention as do not depart from the true spirit and scope thereof.

What is claimed as new and desired to secure by Letter Patent of the United States is:

1. A combination motor-clutch assembly comprising:
   an electric motor having a rotor, a stator, a rotatable shaft mounting said rotor, and at least one end shield carrying a bearing means for said shaft;
   an electro-mechanical clutch positioned around said shaft adjacent said end shield and having a clutch input member driven from said shaft, a clutch output member mounted around said shaft and rotatable with respect to said shaft and an electromagnetic coil for inducing a magnetic field within said output member;
   a clutch cover supported from said end shield having coil mounting means associated therewith supporting said coil;
   said coil mounting means also serving as a flux path for the magnetic field produced by said coil to pass said flux to said output member;
   said output member being axially movable with respect to said input member to effect engagement and disengagement with said input member;
   a driven member rotatably mounted on said shaft for free rotation with respect to said shaft but constrained from axial movement relative to said shaft;
   connection means continuously providing a driving connection between said output member and said driven member while permitting axial movement of said output member relative to said driven member;
   said connection means comprises a plurality of drive pins rigidly carried by said driven member and extending toward said output member;
   said output member having a plurality of apertures formed therethrough;
   each of said connection means having an end formation thereon adapted to extend through a separate one of said apertures to drivingly engage said output member;
   said end formation being adapted to permit the axial movement of said output member relative to said driven member;
   biasing means comprising a plurality of compression coil springs,
   each of said coil springs being concentrically positioned around a separate one of said drive pins between said output member and said driven member to normally bias said output member into driving engagement with said input member; and
   said electromagnetic coil being operative to overcome the operation of said biasing means and to move said output member axially to control the torque transmitted between said members and to effect disengagement of said members.

* * * * *